(12) United States Patent
Adachi

(10) Patent No.: US 9,758,112 B2
(45) Date of Patent: Sep. 12, 2017

(54) WIRE HARNESS

(71) Applicant: YAZAKI CORPORATION, Tokyo (JP)

(72) Inventor: Hideomi Adachi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/864,204

(22) Filed: Sep. 24, 2015

(65) Prior Publication Data

US 2016/0009234 A1 Jan. 14, 2016

Related U.S. Application Data

(63) Continuation of application No. PCT/JP2014/058389, filed on Mar. 25, 2014.

(30) Foreign Application Priority Data

Mar. 26, 2013 (JP) .................................. 2013-063205

(51) Int. Cl.
*B60R 16/02* (2006.01)
*H02G 3/04* (2006.01)
(52) U.S. Cl.
CPC ....... *B60R 16/0215* (2013.01); *H02G 3/0468* (2013.01)
(58) Field of Classification Search
USPC ...................................................... 174/72 C
See application file for complete search history.

(56) References Cited

U.S. PATENT DOCUMENTS

| 6,051,789 A | 4/2000 | Kato |
| 6,187,445 B1 | 2/2001 | Ito et al. |
| 6,666,232 B2 * | 12/2003 | Lepoutre .......... F02M 35/10137 |
| | | 138/119 |
| 7,399,922 B2 * | 7/2008 | Oga .......................... F16L 3/26 |
| | | 174/135 |
| 2004/0099427 A1 * | 5/2004 | Kihira ................. B60L 11/1803 |
| | | 174/359 |
| 2005/0011687 A1 * | 1/2005 | Yamaguchi .............. B60K 6/48 |
| | | 180/65.1 |

(Continued)

FOREIGN PATENT DOCUMENTS

| JP | 8-331728 A | 12/1996 |
| JP | 10-257634 A | 9/1998 |

(Continued)

OTHER PUBLICATIONS

English language Written Opinion of the International Search Report for PCT/JP2014/058389 dated May 13, 2014.

(Continued)

*Primary Examiner* — Timothy Thompson
*Assistant Examiner* — Krystal Robinson
(74) *Attorney, Agent, or Firm* — Kenealy Vaidya LLP

(57) ABSTRACT

Inflexible tube portions are formed so that their inner surfaces are located at the same position as inner surface portions of flexible tube portions. Therefore, the inner diameter of the former is set the same as that of the latter. The inner surface of each inflexible tube portion is formed so as to be connected to the inner surface portion of each adjacent flexible tube portion so as to form a gentle curved surface.

3 Claims, 5 Drawing Sheets

(56) References Cited

U.S. PATENT DOCUMENTS

| | | | |
|---|---|---|---|
| 2006/0134970 A1* | 6/2006 | Watanabe | H02G 11/00 439/501 |
| 2006/0278423 A1* | 12/2006 | Ichikawa | B60R 16/0215 174/72 A |
| 2008/0305731 A1* | 12/2008 | Reid | B01D 45/08 454/65 |
| 2009/0014203 A1 | 1/2009 | Bikhleyzer | |
| 2010/0065298 A1 | 3/2010 | Bikhleyzer | |
| 2011/0132638 A1 | 6/2011 | Oga et al. | |

FOREIGN PATENT DOCUMENTS

| | | | | |
|---|---|---|---|---|
| JP | 2000-47033 | A | | 2/2000 |
| JP | 2001-124248 | A | | 5/2001 |
| JP | 2001124248 | A | * | 5/2001 |
| JP | 2004-224156 | A | | 8/2004 |
| JP | 2007-012514 | A | | 1/2007 |
| JP | 2007-60780 | A | | 3/2007 |
| JP | 2009-27856 | A | | 2/2009 |
| JP | 2009-143326 | A | | 7/2009 |
| JP | 2009143326 | A | * | 7/2009 |
| JP | 2010-980 | A | | 1/2010 |
| JP | 2010-051042 | A | | 3/2010 |
| WO | 2013/039267 | A1 | | 3/2013 |

OTHER PUBLICATIONS

International Search Report and Written Opinion of the International Search Report for PCT/JP2014/058389 dated May 13, 2014.

Office Action dated Sep. 26, 2016 in Chinese patent application No. 201480018796.1 (with English translation).

Chinese Office Action for the related Chinese Patent Application No. 201480018796.1 dated Apr. 19, 2017.

Japanese Office Action for the related Japanese Patent Application No. 2013-063205 dated May 9, 2017.

Japanese Office Action for the related Japanese Patent Application No. 2013-063205 dated Feb. 28, 2017.

* cited by examiner

WIRE HARNESS

CROSS REFERENCE TO RELATED APPLICATIONS

This application is a continuation of PCT application No. PCT/JP2014/058389, which was filed on Mar. 25, 2014 based on Japanese Patent Application (No. 2013-063205) filed on Mar. 26, 2013, the contents of which are incorporated herein by reference.

BACKGROUND OF THE INVENTION

1. Technical Field

The present invention relates to a wire harness including a conductive path and an exterior member through which the conductive path is inserted.

2. Related Art

Among conventional, known wire harnesses are ones that connect high-voltage devices installed in, for example, hybrid vehicles and electric vehicles.

The wire harness disclosed in JP-A-2010-51042 is configured so as to include plural conductive paths, resin corrugated tubes which house the plural conductive paths together, and resin protectors. Plural corrugated tubes each of which is flexible and is shaped like a bellows tube are arranged in the longitudinal direction of the wire harness. The protectors are disposed at portions where path restriction is necessary. Each protector is disposed at a position where adjoining corrugated tubes are connected to each other. The corrugated tubes and the protectors are used to form an exterior member.

SUMMARY

In the above prior art technique, because of the employment of the structure that corrugated tubes are connected to each other by a protector, the inner surface of each connection portion may be formed with a step, which raises the following problem. Where manufacture of a wire harness employs a method that conductive paths are inserted into the exterior member, the conductive paths may be caught on such a step, which affects the workability.

The present invention has been made in view of the above circumstances, and an object of the invention is to provide a wire harness whose configuration includes an exterior member capable of increasing workability.

The invention which has been made to solve the above problem provides a wire harness comprising one or plural conductive paths and an exterior member that has a tube shape and covers the conductive path or paths, characterized in that the exterior member comprises a flexible tube portion and an inflexible tube portion that does not have flexibility on the order of the flexibility of the flexible tube portion, and that inner surfaces of the flexible tube portion and the inflexible tube portion are connected to each other so as to form a gentle surface.

According to the aspect of the invention having the above features, since the inner surfaces of the flexible tube portion and the inflexible tube portion are connected to each other so as to form a gentle surface, the connection portion is not angled. Therefore, when inserted into the exterior member, the conductive path or paths are not caught on any portion of the exterior member. As a result, insertion work is made smooth. According to the invention, the exterior member can be given the structure that is effective at increasing workability.

Furthermore, the invention provides a wire harness that is based on the above wire harness and characterized in that inner diameters of the flexible tube portion and the inflexible tube portion are set identical.

According to the aspect of the invention having the above feature, the inner surfaces of the flexible tube portion and the inflexible tube portion are connected to each other so as to form a gentle surface and further to extend straightly. Therefore, work of inserting the conductive path or paths can be carried out smoothly.

Still further, the invention provides a wire harness that is based on the above wire harness and characterized in that the conductive path or paths are formed so as to extend under a vehicle floor and have such a front-rear length as to span the vehicle floor and the exterior member is formed so as to extend under the vehicle floor and have such a front-rear length as to span the vehicle floor.

According to the aspect of the invention having the above features, applying this aspect of the invention to a long wire harness whose insertion distance is long makes it possible to manufacture the wire harness with high workability.

The invention provides an advantage that it can provide a wire harness whose configuration includes an exterior member that is effective at increasing workability.

DETAILED DESCRIPTION OF EMBODIMENTS

A wire harness is configured so as to include a conductive path and an exterior member. The exterior member includes flexible tube portions and inflexible tube portions and assumes a tube shape. The flexible tube portions and the inflexible tube portions are formed in such a manner that their inner surfaces are connected to each other so as to form a gentle surface.

Embodiment

Figure 1:
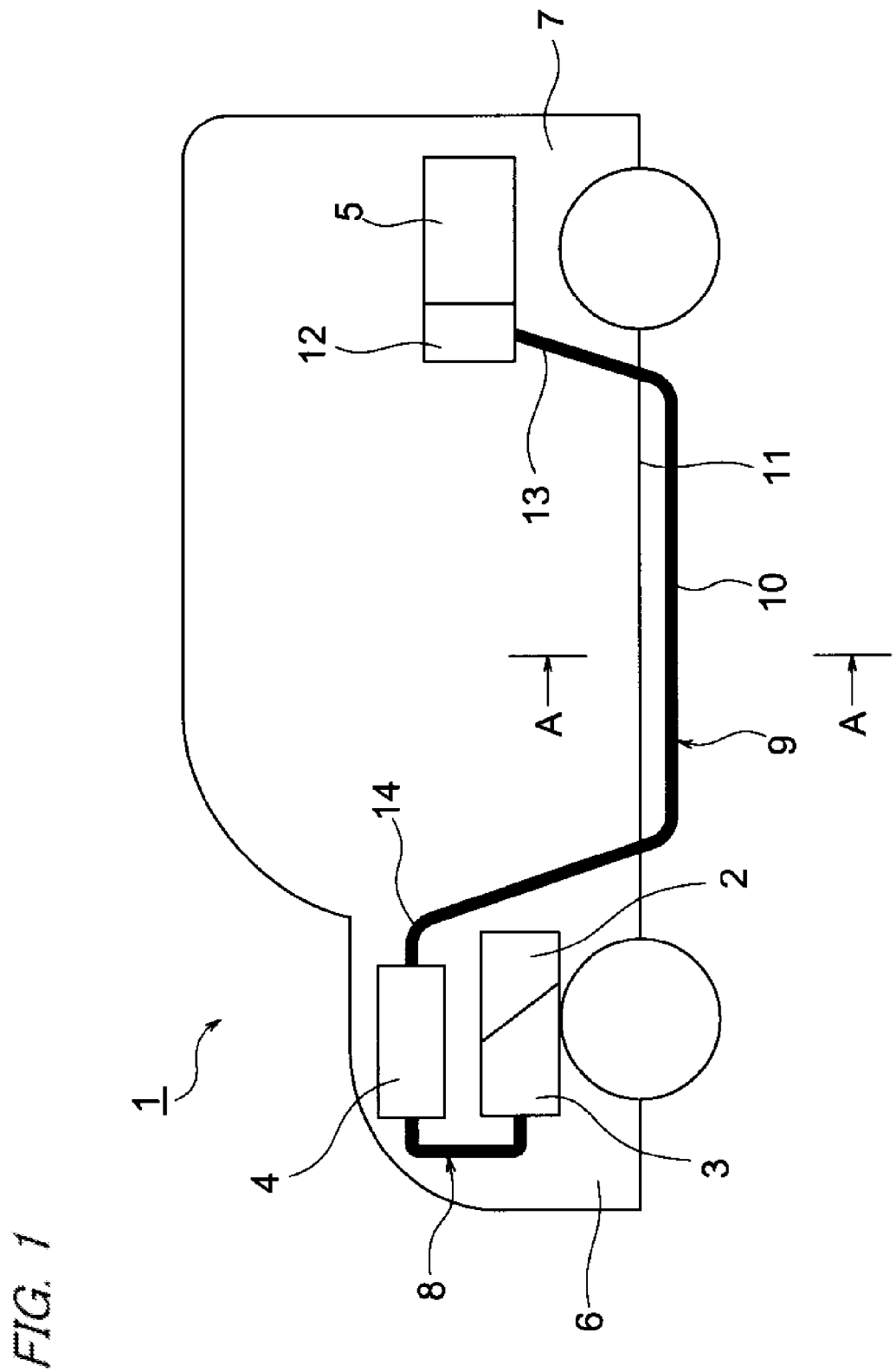
FIG. 1 is a schematic diagram showing how a wire harness according to an embodiment of the present invention is routed.
Figure 2:
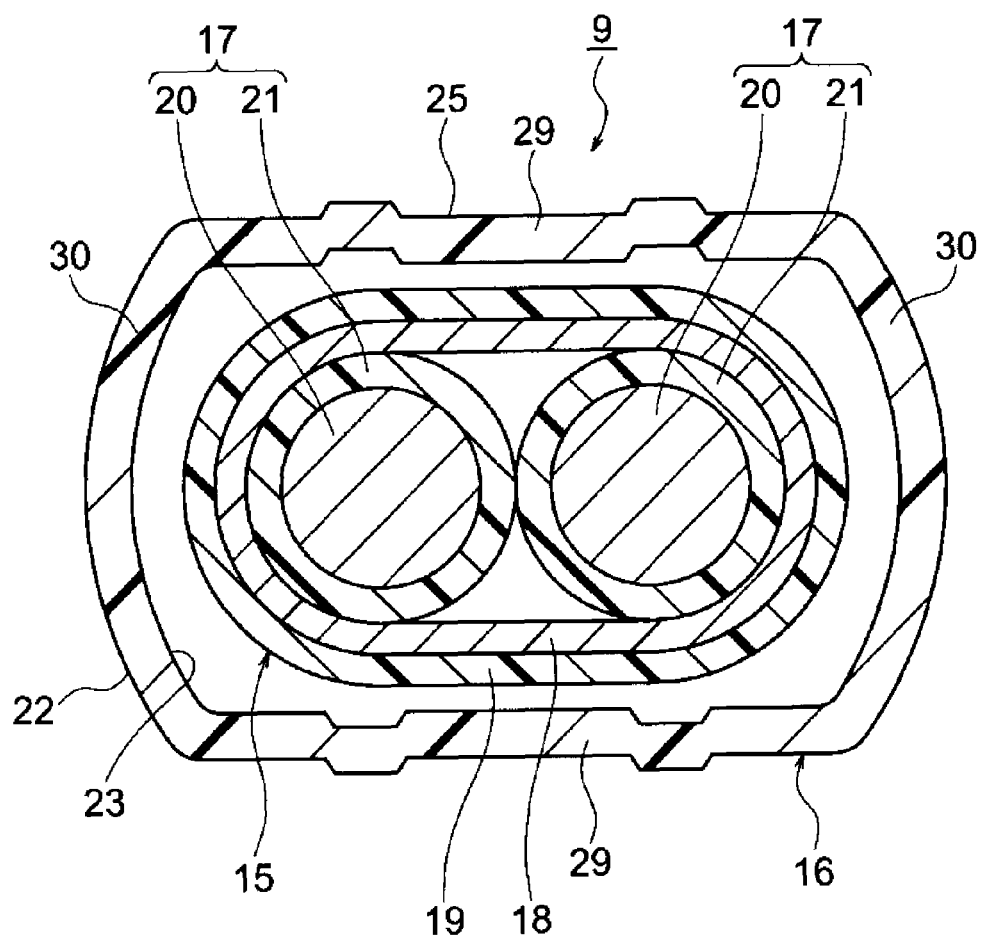
FIG. 2 is a sectional view taken along line A-A in FIG. 1.
Figure 3:
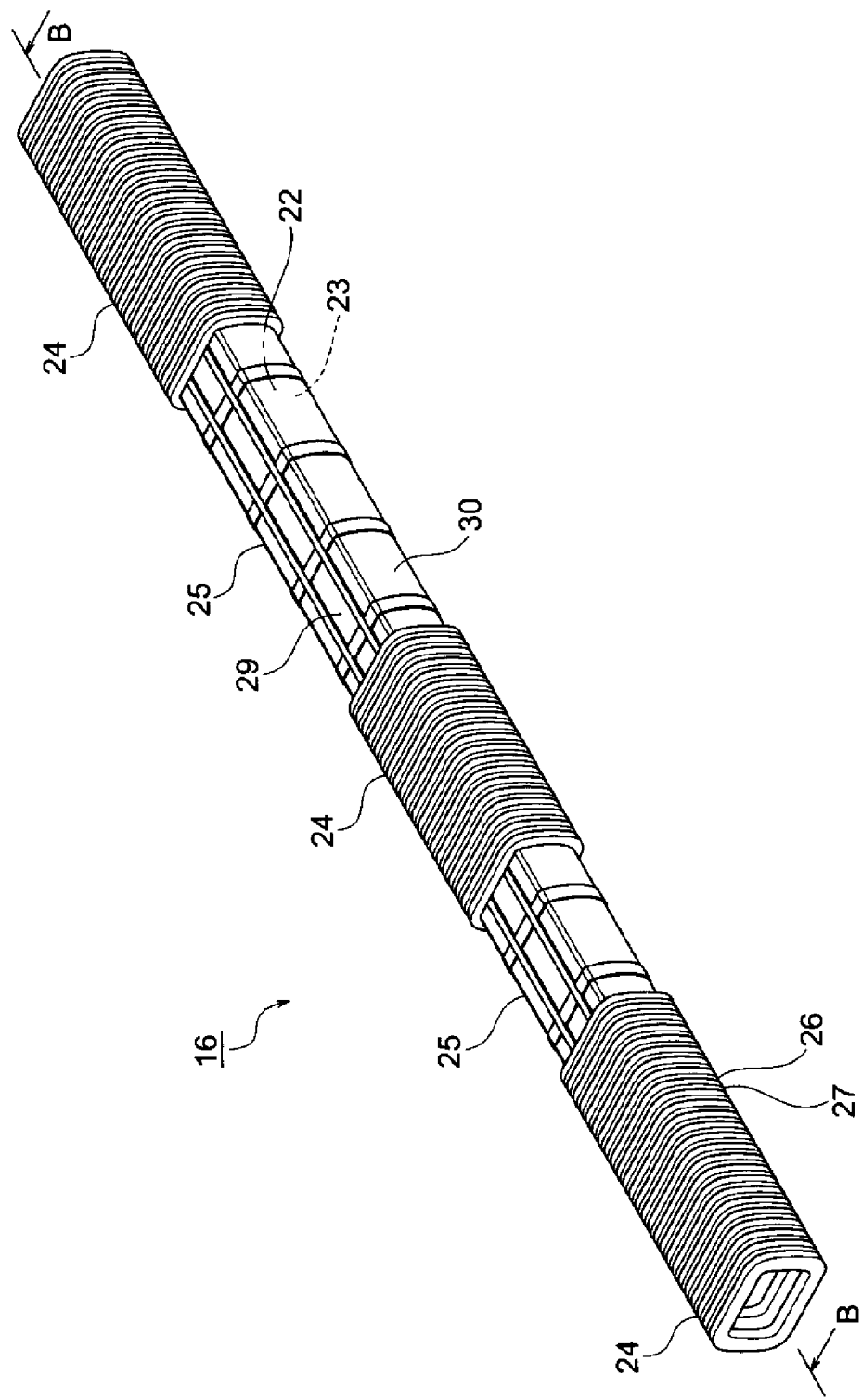
FIG. 3 is a perspective view of an exterior member of the wire harness according to the embodiment of the invention.
Figure 4:
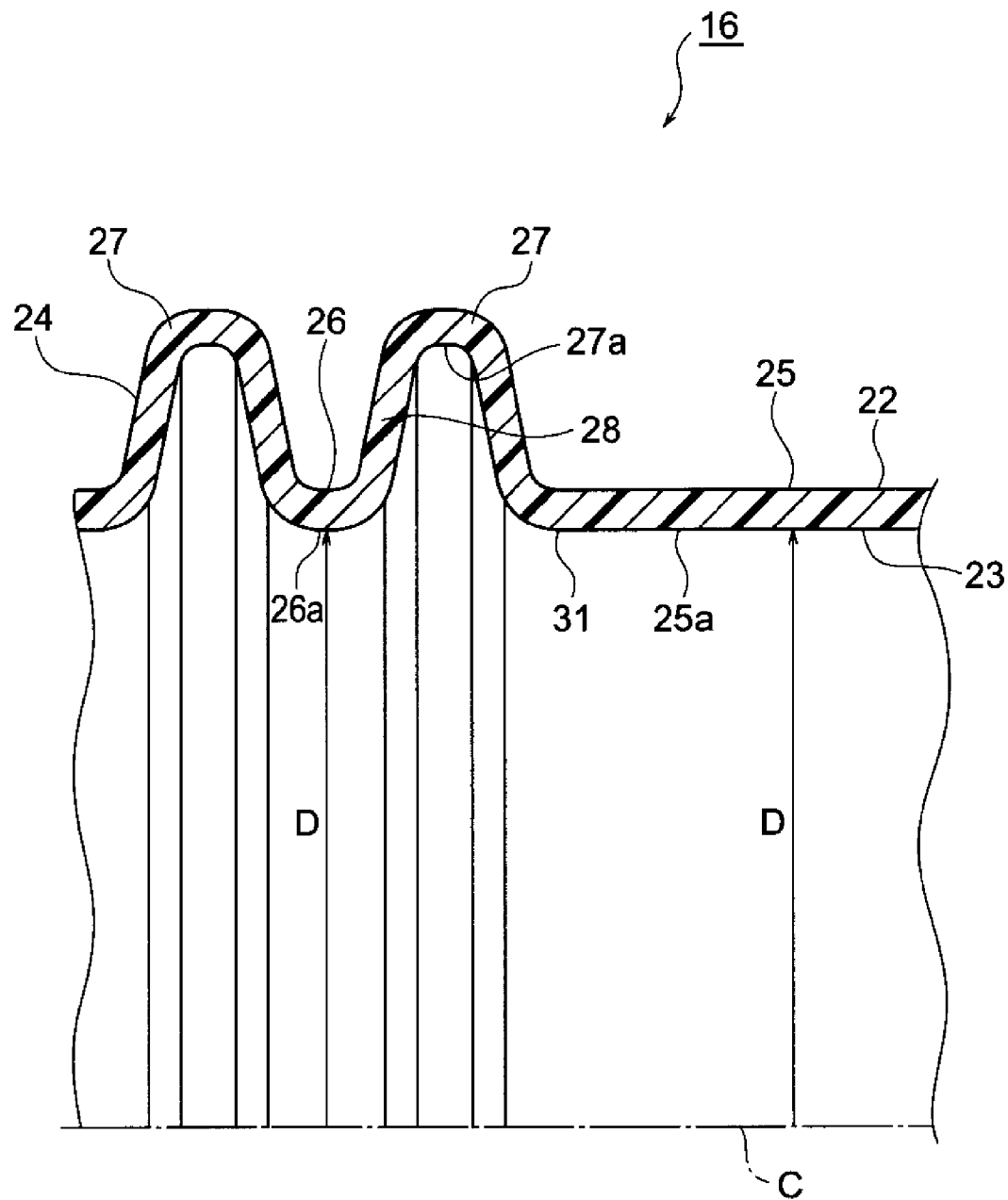
FIG. 4 is a sectional view, taken along line B-B in FIG. 3, of a boundary portion between a flexible tube portion and an inflexible tube portion.
Figure 5:
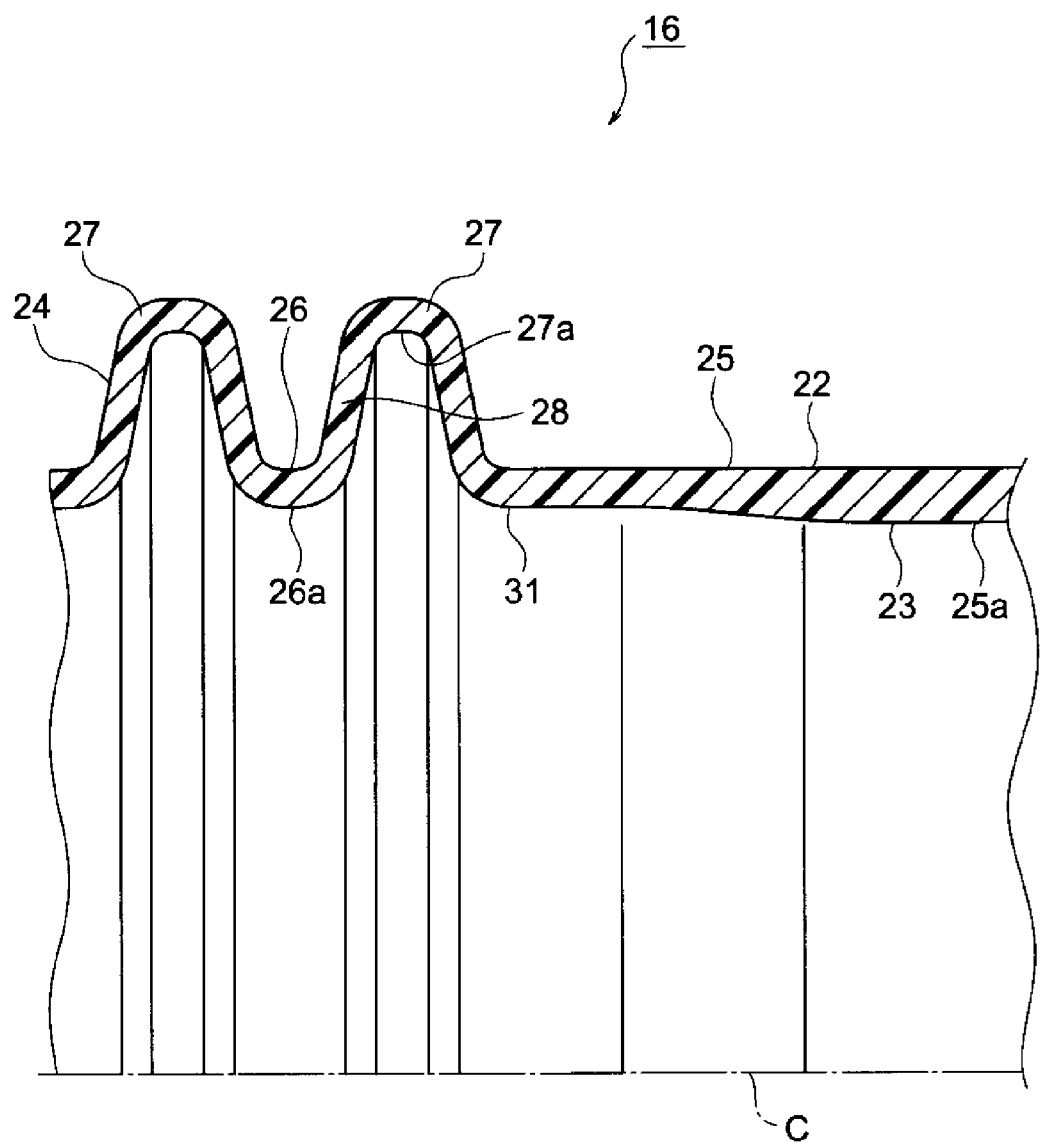
FIG. 5 is a sectional view of a boundary portion between a flexible tube portion and an inflexible tube portion of another example.

An embodiment will be hereinafter described with reference to the drawings. FIG. 1 is a schematic diagram showing how a wire harness according to the embodiment of the present invention is routed. FIG. 2 is a sectional view taken along line A-A in FIG. 1. FIG. 3 is a perspective view of an exterior member of the wire harness according to the embodiment of the invention. FIG. 4 is a sectional view of a boundary portion between a flexible tube portion and an inflexible tube portion. FIG. 5 is a sectional view of a boundary portion between a flexible tube portion and an inflexible tube portion of another example.

In the embodiment, the invention is applied to a wire harness that is routed in a hybrid vehicle (an electric vehicle and a common automobile are possible alternatives).

In FIG. 1, reference numeral 1 denotes a hybrid vehicle. The hybrid vehicle 1 is a vehicle that is driven by two kinds of motive power of an engine 2 and a motor unit 3 in mixture. The motor unit 3 is supplied with electric power from a battery 5 (battery pack) via an inverter unit 4. In the embodiment, the engine 2, the motor unit 3, and the inverter unit 4 are installed in an engine room 6 which is located at the same position as front wheels etc. are disposed. The battery 5 is installed in a vehicle rear portion 7 where rear wheels etc. are disposed (it may be installed in a vehicle compartment that is located in the rear of the engine room 6).

The motor unit 3 and the inverter unit 4 are connected to each other by a high-voltage wire harness 8. Likewise, the battery 5 and the inverter unit 4 are connected to each other by a high-voltage wire harness 9. An intermediate portion 10 of the wire harness 9 is routed under a vehicle floor 11. The intermediate portion 10 is routed approximately parallel with the vehicle floor 11. The vehicle floor 11 is a known body and is what is called a panel member, and through-holes are formed through it at prescribed positions. The wire harness 9 is inserted through the through-holes in a water-tight manner. The side of its rear end 13 and front end 14, wire harness 9 interposing and locating the intermediate portion 10 respectively, can extend to over the vehicle floor 11 as a result of being inserted through the through-holes of the vehicle floor 11.

The wire harness 9 and the battery 5 are connected to each other via a junction block 12 which is attached to the battery 5. The rear end 13 of the wire harness 9 is electrically connected to the junction block 12 by a known method. The front end 14 of the wire harness 9 is electrically connected to the inverter unit 4 by a known method.

The motor unit 3 is configured so as to include a motor and a generator. The inverter unit 4 is configured so as to include an inverter and a converter. The motor unit 3 is formed as a motor assembly that includes a shield case. Likewise, the inverter unit 4 is formed as an inverter assembly that includes a shield case. The battery 5 is of an Ni-MH type or an Li ion type and is in module form. It is possible to use an electricity storage device such as what is called a "capacitor." The battery 5 is not limited to any particular type as long as it can be used in the hybrid vehicle 1 or an electric vehicle.

As shown in FIG. 2, the wire harness 9 is composed of a high-voltage conductive path 15 (conductive path), an exterior member 16 which houses and protects the high-voltage conductive path 15, shield connectors (not shown) which are attached to the ends of the high-voltage conductive path 15, plural clamps (not shown) that are attached to the outer surface of the exterior member 16, grommets, etc.

The wire harness 9 may have a configuration and a structure such that the exterior member 16 houses and protects also a low-voltage conductive path, together with the high-voltage conductive path 15.

The high-voltage conductive path 15 is composed of two high-voltage circuits 17, a shield member 18 which covers the two high-voltage circuits 17, and a sheath 19 which is provided outside the shield member 18. The high-voltage conductive path 15 that is described in the embodiment is an example, and the invention is not limited to or by the configuration and structure of the high-voltage conductive path 15.

The high-voltage circuits 17, which are known high-voltage cables here, are each composed of a conductor 20 and an insulator 21 which covers the conductor 20. The high-voltage circuits 17 are formed so as to have a length that is necessary to connect devices to each other electrically. Since the wire harness 9 electrically connects the inverter unit 4 and the battery 5 (junction block 12) to each other (see FIG. 1), the high-voltage circuits 17 are made long ones. More specifically, the high-voltage circuits 17 are formed so as to be longer than or equal to the front-rear length of the vehicle floor 11 (see FIG. 1), in other words, a path length between the two through-holes, through which the wire harness 9 penetrates, of the vehicle floor 11.

The conductor 20 is made of copper, a copper alloy, aluminum, or an aluminum alloy. The conductor 20 may have either a conductor structure that is a strand of element wires or a rod-shaped conductor structure having a rectangular or circular cross section (e.g., a rectangular or circular single-core conductor structure in which case the cable itself has a rod shape). The outer surface of the conductor 20 having such a structure is covered, by extrusion molding, with the insulator 21 which is made of an insulative resin material.

Although in the embodiment the high-voltage circuits 17 are known high-voltage cables, the invention is not limited to such a case. That is, high-voltage circuits each of which is a known busbar provided with an insulator or like ones may be employed.

The shield member 18 is a member for electromagnetic shielding (a shield member against electromagnetic waves) that covers the two high-voltage circuits 17 together, and is a known cylindrical braid formed by weaving a large number of element wires. The shield member 18 is formed so as to have approximately the same length as the overall length of the two high-voltage circuits 17. An end portion of the shield member 18 is connected to the shield case or the like (not shown) of the inverter unit 4 (see FIG. 1) via the above-mentioned shield connector (not shown).

The shield member 18 may be a conductive metal foil or a member including such a metal foil as long as it can serve as a countermeasure against electromagnetic waves.

The sheath 19 is formed outside the shield member 18 at a prescribed thickness by extrusion molding using an insulative resin material, and is disposed as an outermost layer of the high-voltage conductive path 15.

An example replacement for the high-voltage conductive path 15 is a known shield cable(s) (one or plural cables). Among other example replacements is a high-voltage coaxial composite conductive path (not shown) that is implemented as a single cable having, coaxially, a positive circuit and a negative circuit or three or more circuits.

As shown in FIGS. 2 and 3, the exterior member 16 is a resin tube that covers the above-described high-voltage conductive path 15 and is shaped so as to have an inner diameter necessary for insertion of the high-voltage conductive path 15, a length necessary to house the high-voltage conductive path 15, and a thickness necessary to protect the high-voltage conductive path 15. The exterior member 16 may be shaped so as not to have slits or the like that communicate with its outer surface 22 and inner surface 23. The exterior member 16 may be shaped so as to keep the high-voltage conductive path 15 away from water (waterproofing) and to be long. The exterior member 16 is provided for at least the intermediate portion 10 of the wire harness 9, and is located under the vehicle floor 11 (see FIG. 1) when the wire harness 9 is routed in the vehicle. Therefore, the exterior member 16 is formed so as to be longer than or equal to the front-rear length of the vehicle floor 11 (see FIG. 1), in other words, the path length between the two through-holes, through which the wire harness 9 penetrates, of the vehicle floor 11. The exterior member 16 may be made of a material other than a resin, such as a metal.

In the embodiment, the exterior member 16 is approximately rectangular in cross section (this sectional shape is an example; it may have a circular, elliptical, or like shape; naturally, a flat shape is more effective for height reduction than a circular shape). The exterior member 16 is formed so as to have the illustrated shape as a result of being composed of plural flexible tube portions 24 and plural inflexible tube portions 25 that do not have flexibility on the order of the flexibility of the flexible tube portions 24, in other words, have higher rigidity than the flexible tube portions 24.

The flexible tube portions 24 and the inflexible tube portions 25 are resin-molded into an integral body that is straight in its entirety in a state that the flexible tube portions 24 are not bent. The flexible tube portions 24 and the inflexible tube portions 25 are arranged alternately in the tube axis direction (longitudinal direction) so as to form a continuous body.

The flexible tube portions 24 are disposed at positions that are suitable for the shapes of vehicle attachment target portions (i.e., the shapes of wire harness routing destinations and fixing counterparts). And the flexible tube portions 24 can be formed so as to have lengths that are suitable for the shapes of portions, located at positions where the wire harness 9 is attached, of the vehicle (hereinafter may be referred to as vehicle attachment target portions).

By setting the lengths of the flexible tube portions 24 different from each other in the tube axial direction, they can be bent over necessary lengths that are suitable for the respective vehicle attachment target portions. The flexible tube portions 24 thus formed can be bent at respective desired angles after manufacture of the wire harness 9, that is, during its packing, shipping, and routing for installation in a vehicle (not shown).

Whereas the flexible tube portions 24 can be bent, naturally they can be restored to their original straight shapes.

In the embodiment, as shown in FIGS. 3 and 4, each flexible tube portion 24 is shaped like a bellows tube. More specifically, each flexible tube portion 24 is formed so as to have recesses 26 and projections 27 which extend in the circumferential direction and arranged alternately continuously in the tube axial direction. No particular limitations are imposed on the shape of each flexible tube portion 24 except that it should be flexible.

As shown in FIG. 4, each recess 26 is formed as a valley of the bellows tube shape. Each recess 26 is recessed so as to be convex toward the center axis C (i.e., inward). Each recess 26 is formed so that its bottom serves as an inner surface portion 26a of the flexible tube portion 24. The inner diameter D of each flexible tube portion 24 is defined at the position of its inner surface portions 26a (the inner diameter D shown in the figure is an inner diameter in the shorter axis direction; an inner diameter in the longer axis direction is omitted). On the other hand, each projection 27 is formed as a mountain of the bellows tube shape. Each projection 27 projects so as to be convex toward the side opposite to the center axis C (i.e., outward). The recesses 26 and projections 27 thus formed are connected to each other by slant portions 28.

As seen from FIGS. 3 and 4 and the above description, the exterior member 16 is formed so that its portions, that is, the flexible tube portions 24, are like corrugated tubes. In other words, the exterior member 16 is shaped so as to have corrugated tubes as its portions. Having, as portions, the above-described bellows tube shapes which are characteristic structures of corrugated tubes, the exterior member 16 may be called a "corru-tube," a partially corrugate tube, or the like.

The exterior member 16 may be shaped so as not to have slits extending in the tube axial direction (in other words, cuts for dividing the exterior member 16 along the tube axial direction). One reason why no slits are formed is to prevent entrance of water into the exterior member 16 and thereby increase its waterproofness. Another reason is to prevent part of the high-voltage conductive path 15 from sticking out from a bent portion, for example. A further reason is to increase the rigidity of the exterior member 16 itself.

As long as the above conditions are satisfied, the exterior member 16 may be shaped so as to be able to be divided at prescribed positions in the tube axial direction. In this case, divisional portions are integrated together by bonding, welding, or using additional attaching members for connection (the inner surfaces of the connection portions should not have steps).

The inflexible tube portions 25 are formed as portions that are not bent during packing, shipping, or routing of the wire harness 9 (the term "not to be bent" means not to be given flexibility in a positive sense). Each inflexible tube portion 25 is shaped like a straight tube that is approximately rectangular in cross section (this rectangular shape is an example; it may have a circular, elliptical, or like shape; naturally, a flat shape is more effective for height reduction than a circular shape). The inflexible tube portions 25 are formed at such positions and have such lengths as to be suitable for the above-mentioned vehicle attachment target portions. Assuming straight tube shapes as mentioned above, the inflexible tube portions 25 may be called straight portions, straight tube portions, or the like.

As shown in FIG. 2, each inflexible tube portion 25 which is approximately rectangular in cross section has a pair of longer side walls 29 and a pair of shorter side walls 30. The pair of longer side walls 29 are formed so as to extend in the horizontal direction in the figure which is a sectional view. On the other hand, the pair of shorter side walls 30 are formed so as to extend in the vertical direction while being curved to a small extent. It can be said that this sectional shape can resist vertical external force and vertical external force.

The inflexible tube portions 25 are formed and disposed so that their inner surfaces 25a are located at the same position as the inner surface portions 26a of the flexible tube portions 24. Therefore, the inner diameter D of the former is set the same as that of the latter. The inner surface 25a of each inflexible tube portion 25 is formed so as to be connected to the inner surface portion 26a of each adjacent flexible tube portion 24 so as to form a gentle curved surface. More specifically, a gentle, continuous surface (may be a flat plane) is formed so that the inner surface portions 25a of each flexible tube portion 24 and the inner surface 26a of each adjacent flexible tube portion 24 constitute a straight surface. The inner surface portion 25a of each inflexible tube portion 25 is formed as a non-undulated, that is, flat, surface. The inner surface portions 26a and the inner surfaces 25a correspond to an inner surface 23 of the exterior member 16.

The term "gentle" used above means a state that a connection portion 31 of the flexible tube portion 24 and the inflexible tube portion 25 is not angled, and it may be replaced by "smooth."

Among the plural inflexible tube portions 25, the ones to be attached to the vehicle floor 11 (see FIG. 1) are formed so as to be longer than the ones to be disposed above the vehicle floor 11. For example, the longer inflexible tube portions 25 are attached so as to extend parallel with a reinforcement member.

FIG. 5 shows a modification. In the modification, the flexible tube portions 24 are thin and the inflexible tube portions 25 are somewhat thicker than the flexible tube portions 24. Each of the connection portions 31 of the flexible tube portions 24 and the inflexible tube portions 25 is formed so as to vary in thickness gradually on the side of the inflexible tube portion 25. In the modification, the inner surface 25a of each inflexible tube portion 25 is connected to the inner surface portion 26a of each adjacent flexible tube portion 24 so as to form a gentle slant surface. The invention encompasses this kind of shape.

The wire harness 9 having the above-described configuration and structure is manufactured in the following manner (with no dedicated drawings). That is, the wire harness 9 is manufactured by inserting the high-voltage conductive path 15 into the exterior member 16 that has been resin-molded so as to extend approximately straightly in its entirety, from its one end to the other end, attaching clamps, grommets, boots, etc. to the external surface of the exterior member 16 at prescribed positions, and attaching the shield connectors to the end portions of the high-voltage conductive path 15.

In the manufacture of the wire harness 9, the high-voltage conductive path 15 is inserted smoothly into the exterior member 16 from its one end to the other end. This is because of the use of the exterior member 16 in which the inner surface 25a of each inflexible tube portion 25 is connected to the inner surface portion 26a of each adjacent flexible tube portion 24 so as to form a gentle curved surface.

After being manufactured in the above-described manner, prescribed ones of the flexible tube portions 24 are bent (folded), whereby the wire harness 9 is rendered into a prescribed packed state (the wire harness 9 is compact in this state).

As described above with reference to FIGS. 1-5, in the wire harness 9 according to the invention, the connections 31 are formed so as not to be angled because the inner surface 25a of each inflexible tube portion 25 is connected to the inner surface portion 26a of each adjacent flexible tube portion 24 so as to form a gentle curved surface. Therefore, when inserted into the thus-formed exterior member 16, the high-voltage conductive path 15 is not caught on any portion of the exterior member 16. As a result, work of inserting the high-voltage conductive path 15 can be carried out smoothly even if the wire harness 9 is long.

It goes without saying that various changes can be made without departing from the spirit of the invention.

Although in the above description the exterior member 16 has the sectional shape that the flexible tube portions 24 and the inflexible tube portions 25 are both approximately rectangular, the invention is not limited to such a configuration. That is, for example, the exterior member 16 may be formed so that the flexible tube portions 24 and the inflexible tube portions 25 are circular and approximately rectangular in cross section, respectively, or that the flexible tube portions 24 and the inflexible tube portions 25 are elliptical and approximately rectangular in cross section, respectively.

The features of the above-described wire harness according to the embodiment of the invention will now be summarized below concisely as items [1]-[3]:

[1] A wire harness (9) comprising one or plural conductive paths (high-voltage conductive path 15) and an exterior member (16) that has a tube shape and covers the conductive path or paths, wherein:

the exterior member comprises a flexible tube portion (24) and an inflexible tube portion (25) that does not have flexibility on the order of the flexibility of the flexible tube portion, and inner surfaces of the flexible tube portion and the inflexible tube portion are connected to each other so as to form a gentle surface.

[2] The wire harness according to the above item [1], wherein inner diameters of the flexible tube portion and the inflexible tube portion are set identical.

[3] The wire harness according to the above item [1], wherein the conductive path or paths are formed so as to extend under a vehicle floor and have such a front-rear length as to span the vehicle floor, and the exterior member is formed so as to extend under the vehicle floor and have such a front-rear length as to span the vehicle floor, too.

Although the invention has been described in detail by referring to the particular embodiment, it is apparent to those skilled in the art that various changes and modifications are possible without departing from the spirit and scope of the invention.

The invention provides an advantage that it can provide a wire harness whose configuration includes an exterior member that is effective at increasing workability. Providing these advantages, the invention is useful in the field of wire harnesses that include a conductive path and an exterior member through which the conductive path is inserted.

The invention claimed is:

1. A wire harness comprising:
one or plural conductive paths; and
an exterior member that has a tube shape and covers the conductive path or paths, wherein:
the exterior member comprises a flexible tube portion and an inflexible tube portion that does not have flexibility on the order of the flexibility of the flexible tube portion,
the flexible tube portion and the inflexible tube portion each has a rectangular cross section, and inner surfaces of the flexible tube portion and the inflexible tube portion are connected to each other so as to form a gentle surface,
one of the one or plural conductive paths includes a conductor, an insulator covering the conductor, an electromagnetic shield member covering the insulator, and a sheath disposed on an exterior of the electromagnetic shield member, and
a pair of longer side walls extending in a horizontal direction of the inflexible tube portion are provided with a plurality of projections.

2. The wire harness according to claim 1, wherein inner diameters of the flexible tube portion and the inflexible tube portion are set identical.

3. The wire harness according to claim 1, wherein the conductive path or paths are formed so as to extend under a vehicle floor and have such a front-rear length as to span the vehicle floor, and the exterior member is formed so as to extend under the vehicle floor and have such a front-rear length as to span the vehicle floor.

* * * * *